United States Patent [19]

Cedolin et al.

[11] 4,366,535

[45] Dec. 28, 1982

[54] MODULAR SIGNAL-PROCESSING SYSTEM

[75] Inventors: Riccardo Cedolin; Wolmer Chiarottino; Giuseppe Giandonato; Silvano Giorcelli; Giorgio Martinengo; Giorgio Sofi; Sergio Villone, all of Turin, Italy

[73] Assignee: CSELT - Centro Studi e Laboratori Telecomunicazioni S.p.A., Turin, Italy

[21] Appl. No.: 111,942

[22] Filed: Jan. 14, 1980

Related U.S. Application Data

[63] Continuation-in-part of Ser. No. 13,273, Feb. 21, 1979, abandoned.

[30] Foreign Application Priority Data

Mar. 3, 1978 [IT] Italy .................. 67447 A/78

[51] Int. Cl.³ ............... G06F 11/00; G06F 13/00; G06F 15/16
[52] U.S. Cl. .................................. 364/200; 371/68
[58] Field of Search ... 364/200 MS File, 900 MS File; 371/9, 68

[56] References Cited

U.S. PATENT DOCUMENTS

| | | | |
|---|---|---|---|
| 3,252,149 | 5/1966 | Weida et al. | 364/200 |
| 3,641,505 | 2/1972 | Artz et al. | 364/200 |
| 3,768,074 | 10/1973 | Sharp et al. | 364/200 |
| 3,828,321 | 8/1974 | Wilber et al. | 364/200 |
| 3,889,237 | 6/1975 | Alferness et al. | 364/200 |
| 3,898,621 | 8/1975 | Zelinski et al. | 364/200 |
| 4,015,246 | 3/1977 | Hopkins, Jr. et al. | 364/200 |
| 4,030,074 | 6/1977 | Giorcelli | 364/200 |
| 4,044,337 | 8/1977 | Hicks et al. | 364/200 |
| 4,099,241 | 7/1978 | Ossfeldt | 364/200 |

OTHER PUBLICATIONS

Enslow Jr., "Multiprocessor Organization-A Survey", Computing Surveys, vol. 9, No. 1, Mar. 1977, pp. 104-128.
Braun et al., "Parallel Processing with Minicomputers Increases Performance, Availability", Electronics, Jul. 5, 1979, pp. 125-129.

*Primary Examiner*—Eddie Chan
*Attorney, Agent, or Firm*—Karl F. Ross

[57] ABSTRACT

A signal-processing system, e.g. for a telephone exchange, comprises n modular processing units each including a pair of identical microprocessors operating in parallel on binary signals arriving over an internal bus, only one microprocessor of each pair being enabled to transmit outgoing messages to that bus while the other operates as a dummy. The two microprocessors are interlinked by a correlating connection enabling verification of their correct operation in response to microinstructions read out from respective microprogram memories thereof under the control of a common clock. A momentary divergence, resulting from a relative lag in the response of one microprocessor to an asynchronously arriving signal bit, results in a delay of the microprogram by one clock cycle to permit resynchronization; longer-lasting disparities lead to a deactivation of the microprocessor pair and to the emission of an alarm signal. Processing information individual to the associated peripheral unit is stored in an internal memory connected to the bus; general information utilizable by any processing unit is stored in several outside memory banks accessible through external extensions of the internal bus of any such unit. The processing units may be hierarchically organized in several tiers of different ranks.

7 Claims, 13 Drawing Figures

MODULAR SIGNAL-PROCESSING SYSTEM

CROSS-REFERENCE TO RELATED APPLICATION

This is a continuation-in-part of our copending application Ser. No. 013,273 filed Feb. 21, 1979 and now abandoned.

FIELD OF THE INVENTION

Our present invention relates to a data-processing system and, in particular, to a system for processing telephone signals.

BACKGROUND OF THE INVENTION

In the field of data processing, different tasks may require respective electronic systems widely divergent as to processing speed, storage capacity and reliability. Commercially available data processors are generally rigidly structured and are frequently adapted to a specific purpose only through the utilization of a duly designed logic network. It is of course possible to use a processor whose speed and capacity are larger than those required, yet such a more complex system involves a higher failure probability; furthermore, its cost is higher than that of a commercially available processor whose speed, capacity and reliability matches the existing requirements.

In the area of telecommunications, sequences of repetitive operations with low decision levels are performed on enormous amounts of data, e.g. on subscriber-line signal-level transitions accompanying the selection of call-number digits. Such repetitive operations are generally performed by a specialized computing device, called a "preprocessor", which is connected via an interface to a main processor. Disadvantages inherent in the utilization of two basically different devices include a higher probability of failure aggravated by the necessarily specialized communication interfaces, higher maintenance and operating costs, and increasingly difficult technical control due to the necessity of providing two different checking systems, one for the preprocessor and one for the main processor.

OBJECTS OF THE INVENTION

An object of our present invention is to provide a reliable and inexpensive data-processing system which is easily adapted to a broad range of operational requirements.

Another object of our invention is to provide a modular processing system having individual modules specialized for predetermined functions and arrangeable in a wide variety of configurations satisfying different needs.

A further object of this invention is to provide a data-processing system with efficient self-checking means.

SUMMARY OF THE INVENTION

An electronic signal-processing system dialoguing with associated peripheral units comprises, according to our present invention, a plurality of modular processing units, a plurality of memory banks storing general processing information utilizable by any of these processing units, and access means individual to each memory bank for facilitating communication thereof with any processing unit, in response to a request therefrom, via a corresponding external two-way extension. Each processing unit includes a pair of substantially identical micro-processors, i.e. an active component and a dummy or standby, interlinked by a correlating connection and provided with input connections for receiving incoming messages from an internal signal path, only the active or "hot" microprocessor having output connections for transmitting outgoing messages to the respective internal signal path. In each processing unit, an interface is inserted between the signal path and an associated peripheral unit while an internal memory is connected to the signal path for storing processing information individual to the associated peripheral unit. A coupling component is provided in each processing unit for selectively connecting its signal path to any of a plurality of external two-way extensions thereof.

According to another feature of our present invention, each microprocessor includes logical circuitry for performing calculations and other processing operations in response to microinstructions periodically read out from a microprogram memory under the control of a sequencer which advances the microprogram by emitting the addresses of these microinstructions. The advance of the microprogram may be modified by monitoring means operatively connected to both sequencers to detect an out-of-step condition, specifically by a comparator connected across two conductors that are tied to the stepping inputs of the two sequencers. A time base works into the logic circuitry and the sequencer of each microprocessor for establishing their operating cycle; when the comparator detects the aforementioned out-of-step condition, it causes the time base to double the normal duration of that operating cycle so as to facilitate resynchronization of the two microprocessors if this condition is terminated after not more than one normal operating cycle. At least the dummy or "cold" microprocessor may further include additional comparators connected between its logical circuitry and the signal path for checking the results of parallel processing operations performed by the two microprocessors; these additional comparators signal an alarm condition, preferably with deactivation of the paired microprocessors, upon detecting a divergence in their outputs (e.g. as a result of an out-of-step condition lasting more than one cycle).

According to another feature of our present invention, each microprocessor of a processing unit includes an address store for transmitting memory-bank addresses to the coupler of that unit, a source of data and addresses of data-storage locations in the memory banks and in the internal memory, and a decoder connected to the data source and to the store for enabling the emission of memory-bank addresses therefrom to the associated coupler upon detecting the generation of an external-memory address by this source. Preferably, the decoder is a comparator which emits an enabling signal to the store upon detecting a locally generated address whose numerical value exceeds a predetermined threshold.

Pursuant to a further feature of our present invention, the memory banks are subdivided into at least a first group and a second group, each bank in the first group containing information identical with information stored in a corresponding bank in the second group. Each microprocessor includes a microprogram memory linked to the store for alternately reading, whenever the local source emits data to be loaded into a bank of the first group, the addresses of such bank and the corresponding bank in the second group. It is advantageous to form the store as a read/write memory controlled by the microprogram memory for addressing only a normally operating member of a memory-bank pair having a malfunctioning member.

Pursuant to yet another feature of our present invention, the coupler of each processing unit includes a plurality of transmitter/receivers for selectively connecting the signal path to respective external two-way extensions thereof. A decoder in the coupler is tied to the read/write memory and to the transmitter/receivers for controlling same to connect the signal path to an extension selected in accordance with an address emitted by the read/write memory.

At least one processing unit may include a bi-port memory connecting the signal path of the processing unit to an additional microprocessor.

BRIEF DESCRIPTION OF THE DRAWING

These and other features of our present invention will now be described in detail with reference to the accompanying drawing in which:

FIG. 2b is a graph of control signals used in the microprocessor of FIG. 2a;

SPECIFIC DESCRIPTION

Figure 1:
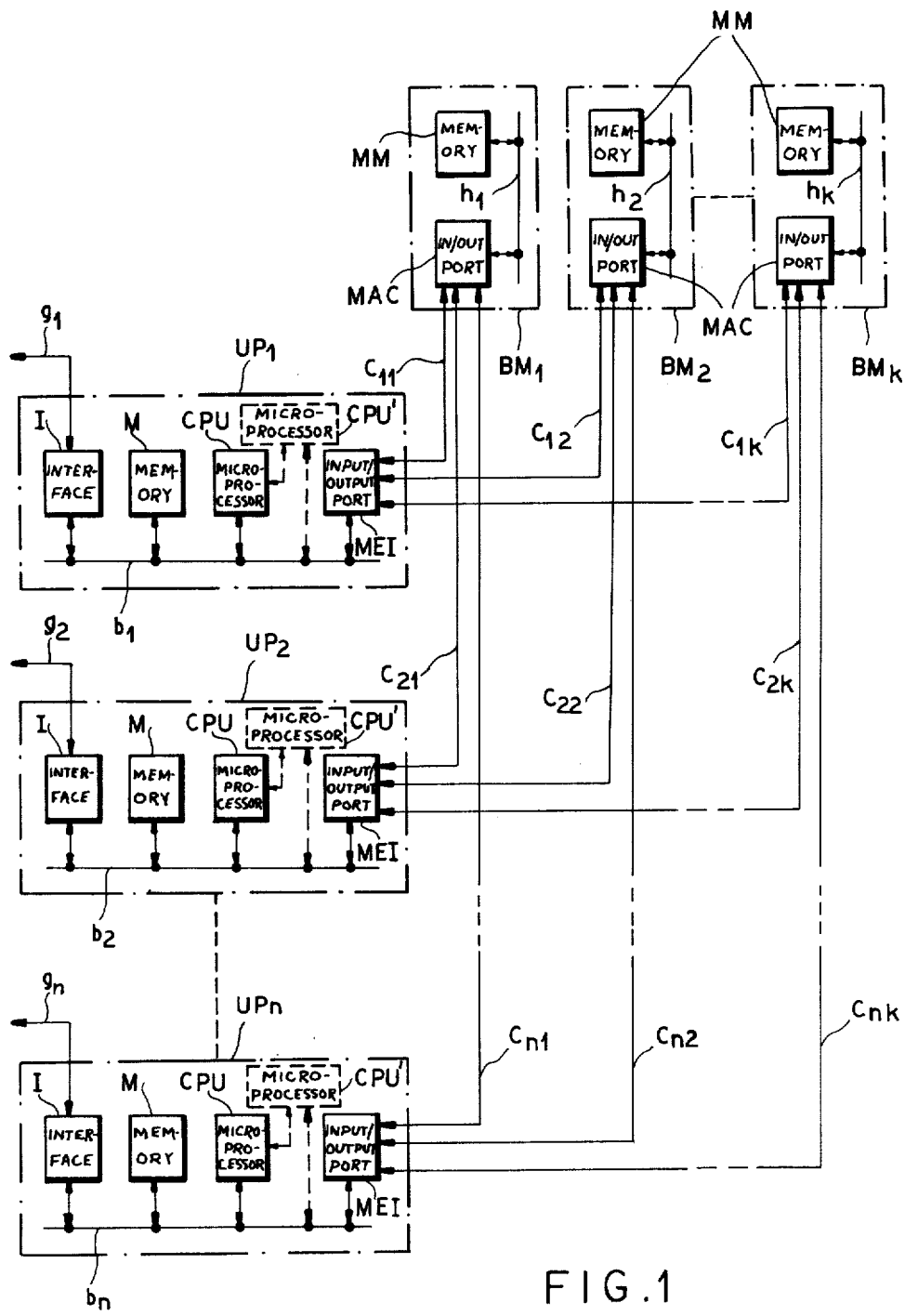
FIG. 1 is a block diagram of a configuration of a data-processing system according to our invention.

As illustrated in FIG. 1, a multiconfigurable modular processing system according to our present invention comprises k memory banks $BM_1$, $BM_2$-$BM_k$ connected by n.k bidirectional buses $C_{11}$, $C_{21}$-$C_{n1}$, $C_{12}$, $C_{22}$-$C_{n-2}$-$C_{1k}$, $C_{2k}$-$C_{nk}$ to n modular processing units $UP_1$, $UP_2$-$UP_n$. The set of k memory banks $BM_1$-$BM_k$ may be subdivided into a group of primary banks, a group of secondary banks and a group of reserve or standby banks, the identity of any particular bank $BM_i$ (i=1,2-k) varying in time according to the progress of the processing operations as described in detail hereinafter. Each memory bank $BM_1$-$BM_k$ includes at least one memory module MM linked by means of an asynchronous bidirectional bus $h_1$, $h_2$-$h_k$ to an input/output port MAC which has a logic circuit ARB (FIG. 4) for arbitrating requests of access to the respective memory MM. The ports MAC of memory banks $BM_1$-$BM_k$ are tied via buses $C_{11}$-$C_{nk}$ to input/output ports or couplers MEI of processing units $UP_1$-$UP_n$.

In addition to its port MEI, each unit $UP_1$-$UP_n$ includes at least one input/output interface I communicating with one or more associated peripheral units (not shown) via a lead $g_1$, $g_2$-$g_n$, at least one internal data store or memory M similar in structure to the external memories MM of units $BM_1$-$BM_k$, and a microprocessor CPU with a twin CPU' operating in parallel. The various components of each processor $UP_1$-$UP_n$ are interconnected by means of an asynchronous bidirectional internal signal path in the form of a bus $b_1$, $b_2$-$b_n$.

Figure 2A:
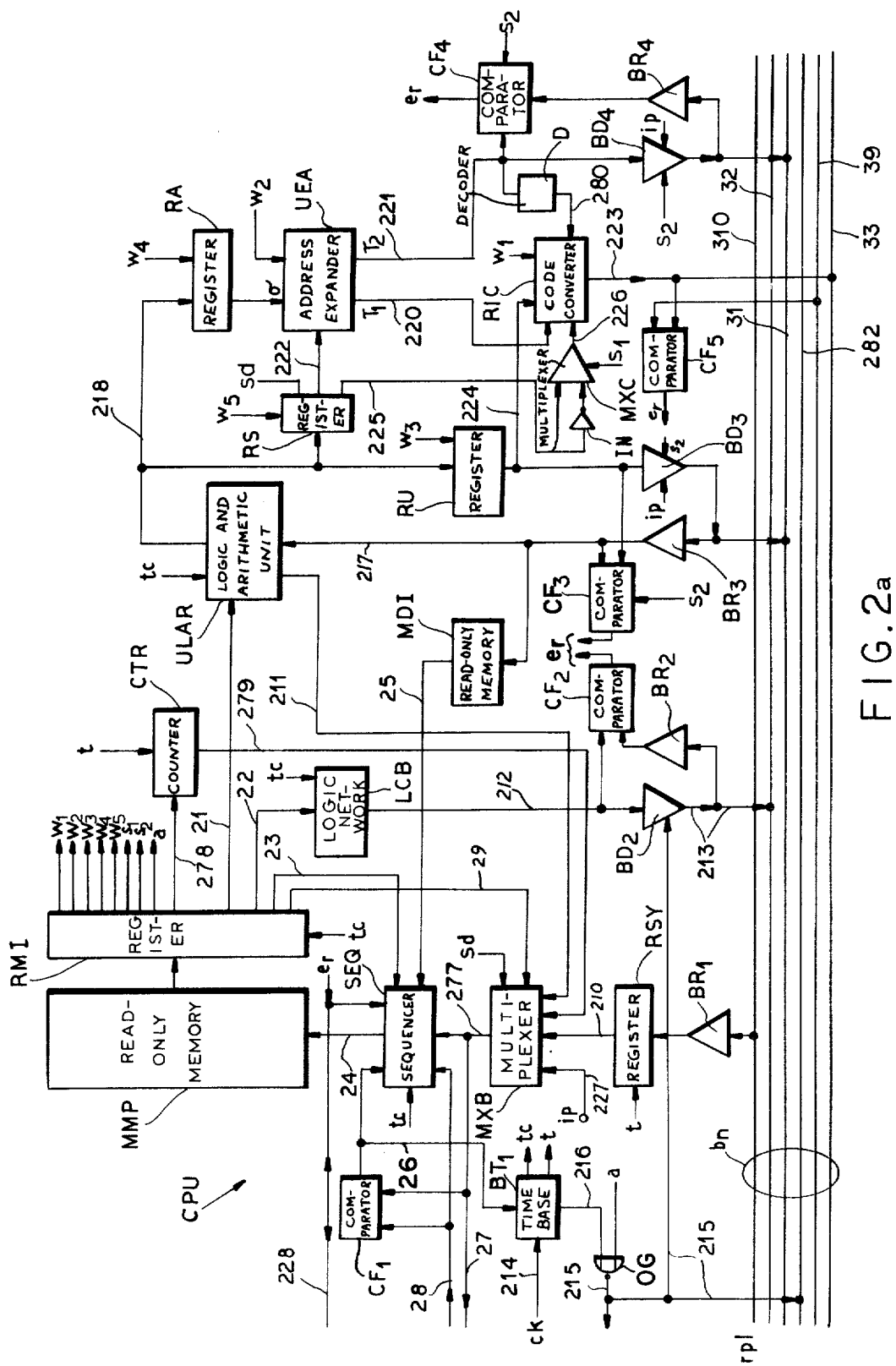
FIG. 2a is a block diagram of a microprocessor forming part of a modular processing unit shown in FIG. 1.

As shown in FIG. 2a, microprocessor CPU of unit $UP_n$—representative of corresponding components of all other processors of FIG. 1—includes a read-only microprogram memory MMP feeding microinstructions to a buffer register RMI under the control of a reading device or sequencer SEQ. Microinstructions read from memory MMP are decoded by register RMI and emitted thereby as writing commands, $W_1$, $W_2$, $W_3$, $W_4$, $W_5$, a switching signal $S_1$ for a multiplexer MXC, an enabling signal $S_2$ for a pair of driver circuits or transmitters $BD_3$ and $BD_4$, or a blocking signal a passed via a NOR gate OG and a lead 215 to a transmitter $BD_2$ for inhibiting the emission of commands by microprocessor CPU to a multiple 32 forming part of its associated bus $b_n$. Transmitters $BD_2$, $BD_3$, $BD_4$ and respective receivers $BR_2$, $BR_3$, $BR_4$ in parallel therewith translate the logic levels of the microprocessor into those handled by bus $b_n$ and vice versa.

In response to the microinstruction read out from memory MMP, register RMI may generate a signal on a lead 278 extending to a counter CTR, this signal serving to reset that counter. On a lead 21 working into a calculator ULAR, register RMI transmits instructions specifying logical and arithmetic operations to be carried out on data pairs stored in registers inside the calculator or received via input port $BR_3$ and a lead 217 from a bidirectional multiple 31 of bus $b_n$. Another output lead 22 extends from register RMI to a logic network LCB and carries signals for resetting internal registers and activating signal-generating circuits of this network. Register RMI transmits to sequencer SEQ, over a lead 23, instructions relating to a subsequent microinstructions address to be fed to memory MMP on a connection 24; in particular, the signal carried by lead 23 may code a pair of addresses to be alternatively selected by sequencer SEQ depending for example upon the arrival or nonarrival of an acknowledgment or execution signal rpl on a lead 310 of bus $b_n$ as determined by a bit present on an output lead 277 of a multiplexer MXB. This multiplexer is connected via a lead 29 to register RMI for receiving therefrom a command controlling its internal switching operations.

Multiplexer MXB has four data inputs served by leads 210, 211, 227, 279, a switching input tied to output lead 29 of register RMI, and another switching input connected to a lead carrying a discriminating bit sd from a register RS, as more fully described hereinafter. Lead 210 extends from a register RSY, having a pair of cascaded stages (not shown), loaded by a receiver or input port $BR_1$ which is in turn linked to lead 310 carrying the aforementioned acknowledgment signals rpl from interface I, memory M and port MEI (FIG. 1) as an indication of the execution of operations commanded by logic network LCB. Lead 211 extends to multiplexer MXB from calculator ULAR and transmits information relating to the results of logical and arithmetic operations performed by this device, e.g. whether such results are negative or zero.

A selection signal ip applied to lead 227 by a nonillustrated switch determines in a semipermanent manner whether microprocessor CPU or its twin CPU' may actively transmit data on bus $b_n$. It is to be noted that microprocessors CPU and CPU' both have the structure shown in FIG. 2a and are interconnected by leads 27, 28, 215, 228 as well as by bus $b_n$, as more fully described hereinafter. Signal ip is also fed to inhibiting inputs of transmitters BD$_3$, BD$_4$ and is of different binary value in the two paired microprocessors CPU, CPU' so as to disable the transmitters of component CPU' connected to the outgoing lines of bus $b_n$; initially, either of these microprocessors could be selected as the nontransmitting or dummy component.

Lead 279 extends to multiplexer MXB from counter CTR which generates an output signal upon reaching a predetermined count, thereupon restarting its counting operation. In addition, counter CTR may be reset at any time by microinstruction memory MMP via register RMI and lead 278.

The signal switched onto output lead 277 by multiplexer MXB in response to energization of lead 29 is transmitted to a stepping input of sequencer SEQ of component CPU and over correlating lead 27 to the corresponding device of twin microprocessor CPU'. Multiplexer MXB of microprocessor CPU' emits a signal to sequencer SEQ of FIG. 2a on the other correlating lead 28. Each sequencer SEQ has registers for storing various internal states of the respective microprocessor and a logic circuit for deciding on a microinstruction address according to conditions present at the inputs of the sequencer. Thus, for example, the address chosen or generated by the sequencer will reflect the presence or absence of signal identity on correlating leads 27 and 28. Sequencer SEQ has another input lead 25 extending from a read-only memory MDI for the transmission of initial addresses of respective microinstruction sequences; read-only memory MDI is addressed by incoming signals arriving over bidirectional multiple 31, receiver BR$_3$ and lead 217.

A comparator CF$_1$ having respective inputs tied to leads 27 and 28 generates a signal on a lead 26 upon detecting a disparity of their voltage levels. Lead 26 works into sequencer SEQ of component CPU and into a time base BT$_1$ which determines the operating cycle of sequencer SEQ and derives a recurrent signal t of period T (see FIG. 2b) from clock pulses ck received on a lead 214, timing signal t being fed to counter CTR and to register RSY. The period T of signal t is the time interval set for the execution of any microinstruction read out from memory MMP.

Time base BT$_1$ has a conventional self-checking circuit which may include a monoflop retriggerable during its off-normal period by the leading edge of an incoming clock pulse. The monoflop advantageously has an off-normal period equal to two clock cycles and is fed the clock pulse via an AND gate having a negated input connected to lead 26. Thus, upon the generation by comparator CF$_1$ of a disparity signal at least two clock cycles in duration, this self-checking circuit emits a signal on lead 216 extending to NOR gate OG, transmitters BD$_2$ of both components CPU and CPU' being consequently disabled by a "0" level present on lead 215 which interlinks the outputs of their gates OG in a "wired OR" connection. These transmitters are also disabled if comparator CF$_1$ of microprocessor CPU' detects a disparity in the signal levels of leads 27 and 28; component CPU' receives the clock pulses on lead 214 concurrently with component CPU. A zero-level signal produced by NOR gate OG upon receiving a disabling signal a from register RMI or a disparity signal on lead 216 is transmitted to a lead 282 of bus $b_n$ for activating an alarm light (not shown) alerting an operator to a microprocessor malfunction or failure; in addition, the signal on lead 282 may be sent via ports MEI and MAC to other processing units.

Figure 2B:
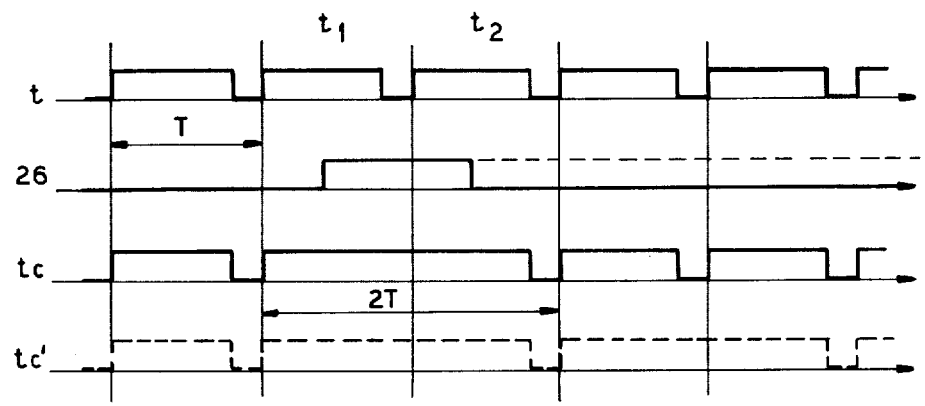

We shall now refer to FIG. 2b in describing a control signal tc emitted by time base BT$_1$ to register RMI, logic network LCB, sequencer SEQ and calculator ULAR. During any time that lead 26 is de-energized, signal tc has the same form, and therefore the same period T, as signal t. On the other hand, upon the generation of a disparity signal by comparator CF$_1$, control signal tc is transformed to have a period 2T through suppression of every other zero-going transition of signal t as long as the disparity persists, as indicated in a graph tc' of FIG. 2b. If lead 26 is energized in a clock cycle t$_1$ and is de-energized in the immediately succeeding cycle t$_2$, signal tc will form a single pulse spanning the consecutive cycles t$_1$, t$_2$ rather than two pulses separated by a trough (signal t), as indicated in FIG. 2b. Thus, in the event that microprocessors CPU, CPU' are desynchronized for one cycle so that different logic levels are read for the same bit on lead 310, as when one register RSY picks up a voltage change near the end of a reading period while its counterpart in the other microprocessor does so only in the next cycle, the error will be detected before the microprograms even have an opportunity to respond to the misread bit. While the operations of register RMI, logic network LCB, sequencer SEQ and calculator ULAR are temporarily suspended by signal tc, signal t induces the unloading of a stage of register RSY containing the misread bit. If the next bit is read correctly by both microprocessors, their correlation will be restored when the address which was to appear on connection 24 in cycle t$_1$ is read out from the corresponding sequencer in the next-following cycle t$_2$. If the disparity persists, however, an error will be registered with deactivation of the paired components CPU, CPU' as described hereinafter.

The results of logic and arithmetic operations performed on pairs of $\sigma$-bit words by calculator ULAR under the control of microprogram memory MMP are emitted on a connection 218 and distributed among three registers RU, RA, RS in response to writing signals W$_3$, W$_4$, W$_5$, respectively. A $\sigma$-bit address temporarily stored in register RA is transferred to the internal registers of an address expander UEA under the control of writing signal W$_2$. A logic circuit in device UEA combines address bits from register RA with information regarding the internal status of microprocessor CPU, transmitted from register RS over a lead 222, to generate a $\tau$-bit address ($\tau > \sigma$) consisting of $\tau_1$ least-significant bits emitted on a connection 220 and $\tau_a$ most-significant bits emitted on another connection 221. Connection 220 feeds a reading input of a fast read/write memory or code converter RIC which stores addresses of memory banks BM$_1$–BM$_k$ and emits these addresses on an output connection 223 extending to a comparator CF$_5$ and to an outgoing multiple 33 of bus $b_n$. The reading of addresses from memory RIC is effectuated by the $\tau_1$bit-signal arriving from address expander UEA on connection 220 and by a single bit carried by a lead 226 from multiplexer MXC; a total of $2^{\tau_1+1}$ addresses are located into as many cells of memory RIC from register RU via a connection 224 in the presence of writing signal $W_1$.

Multiplexer MXC has inputs connected to register RS, directly and through an inverter IN, via a lead 225 carrying a supplemental bit. Signal $S_1$, appearing at the switching input of multiplexer MXC, thus modifies the address code specifying reading and writing operations such as "read instructions", "read data" or "test and set" to be performed in a selected memory bank $BM_1-BM_k$. Signal $S_1$ is emitted by register RMI in response to the discriminating bit sd fed to multiplexer MXB. Writing takes place only in a primary bank when that bit has one logical value ("s" for "single") but is effected first in a primary bank and thereafter in a secondary bank when the bit is at its alternate logical level ("d" for "duplication"). In the latter instance, multiplexer MXC is induced by microprogram memory MMP via register RMI and signal $S_1$ to connect output lead 226 to input lead 225 first directly and then via inverter IN.

Output line 221 of address expander UEA extends to a comparator $CF_4$, a decoder D and transmitter $BD_4$. Decoder D functions as a comparator which emits a signal to memory RIC via a lead 280 whenever a predetermined theshold is exceeded by the numerical value of the address portion present on lead 221. The energization of lead 280 modifies the output of memory RIC to indicate that the information read out therefrom concerns one of the external memories $BM_1-BM_k$ (or a primary/secondary combination thereof), as determined by the address code traversing the transmitter $BD_4$, rather than the associated internal memory M (FIG. 1).

Comparator $CF_4$, connected at a first input to lead 221 and at a second input to data-and-address multiple 31 via receiver $BR_4$, is functionless in component CPU but its counterpart in component CPU' emits an error signal $e_r$ to sequencers SEQ of both components, via lead 228, upon detecting a divergence between an address generated by device UEA on lead 221 and a parallel address produced in microprocessor CPU' by the corresponding device thereof. Such a discrepancy may be detected by the twin of comparator $CF_4$ since transmitter $BD_4$ of component CPU is enabled by signal ip to permit it to pass the $\tau_2$-bit address from lead 221 of that component to multiple 31. The operation of comparator $CF_4$ is triggered by signal $S_2$ which establishes the writing phase of a clock cycle as described hereinafter with reference to FIG. 2c.

Another comparator $CF_3$ is connected to lead 217 at the output of receiver $BR_3$ and to the output lead 224 of register RU, working into transmitter $BD_3$, for monitoring the results of the arithmetic operations performed by the calculators ULAR of microprocessors CPU and CPU'. Since transmitter $BD_3$ of dummy CPU' is disabled by signal ip, its comparator $CF_3$ will emit error signal $e_r$ to sequencers SEQ upon detecting a disparity of the results produced by these calculators operating in parallel. Like comparator $CF_4$ and transmitters $BD_3$, $BD_4$, comparator $CF_3$ is activated by switching command $S_2$.

Logic network LCB is tied via a lead 212 to transmitter $BD_2$ which in turn works into multiple 32 of bus $b_n$ via a lead 213. The receiver or input port $BR_2$ connected to multiple 32 feeds a comparator $CF_2$ linked at another input to lead 212. Comparator $CF_2$ transmits error signal $e_r$ to sequencers SEQ upon detecting the mismatching of command signals generated by microprocessors CPU, CPU' whenever their transmitters $BD_2$ are blocked by the de-energization of lead 215. Signal $e_r$ is also emitted by comparator $CF_5$ in the event of a diversity between an address read out from memory RIC and a verification signal from port MEI (see FIG. 3).

Upon the generation of signal $e_r$ by any of the aforementioned comparators $CF_2-CF_5$, each sequencer SEQ forwards to its memory MMP a predetermined microinstruction address independent of signals present on leads 23, 25, 26, 27/28 and 277. Under the control of memory MMP, acting upon multiplexer MXB via lead 29, the contents of a register in calculator ULAR are checked to determine if the error is spurious, i.e. due to a programmed perturbation of the outputs of devices LCB, ULAR and UEA by the periodic readout of incongruous instructions from memories MMP of the two microprocessors to ascertain whether comparators $CF_2-CF_5$ are functioning correctly. If this is the case, both microprocessors resume normal operations; otherwise, i.e. if the error is legitimate as established by the absence of a special bit on lead 211, at least one memory MMP emits signal a via register RMI, thereby disabling both transmitters $BD_2$ and effectively isolating both microprocessors CPU, CPU' from the rest of the system. Logic networks LCB are cleared at the same time, via their respective input connections 22, as the microprogram jumps to a cutoff phase. The alarm signal generated by the de-energization of leads 215 and 282 may be transmitted to other processors, coacting with the disabled unit $UP_n$ (FIG. 1), and to the associated peripheral unit or units.

Thus, any occurring error is detected within a single reading or writing cycle and is prevented from spreading beyond the originating processor $UP_n$. It is not unlikely that a malfunction will go by undetected, because the probability of simultaneous failure in both components of a microprocessing pair CPU, CPU' canceling the error signal is extremely small.

Owing to the asynchronous nature of the system, however, care must be taken to avoid minor temporal offsets in the operations of the two paired microprocessors CPU, CPU' from being registered as an error. If an asynchronous acknowledgment signal rp2, i.e. a change in the voltage level of lead 310, happens to arrive at such a time—as discussed above—that the event is reported to the register RSY of microprocessor CPU in one clock cycle and to the corresponding register of its twin CPU' in an adjoining clock cycle, comparator $CF_1$ will detect a disparity on the output leads 27, 28 of the respective multiplexers MXB and will energize lead 26 in time interval $t_1$ (FIG. 2b) representing the first of these clock cycles. The resulting lengthening of stepping pulse tc delays the advance of both memories MMP, by the respective sequencers SEQ, for one clock cycle. If there is no failure, i.e. if lead 26 is de-energized in the next time interval $t_2$, logic network LCB, sequencer SEQ and calculator ULAR of each microprocessor will then be activated by signal tc to perform those operations which would have been accomplished in interval $t_1$ if there had been no offset. Thus, there is no loss of information and processing unit $UP_n$ continues to function. If, on the other hand, there is a failure causing a continued energization of lead 26 by comparator $CF_1$, devices LCB, SEQ and ULAR will continue their operations in response to pulses tc' (FIG. 2b), whereupon the failure will eventually be detected, generally in the immediately following clock cycle, by comparators $CF_2$–$CF_5$. Loss of synchronism between microprocessors CPU, CPU' will also be detected in the event that results of the respective calculators diverge (lead 211). It is to be noted that checking in a processing system according to our present invention takes place on at least two levels, at the reading and writing level by means of comparators $CF_2$–$CF_5$ and during each microcycle by means of comparator $CF_1$, and that the paired microprocessors CPU, CPU' function as a single element and are interconnected basically by only three leads 27, 28, 228, which greatly facilitates installation.

Figure 2C:
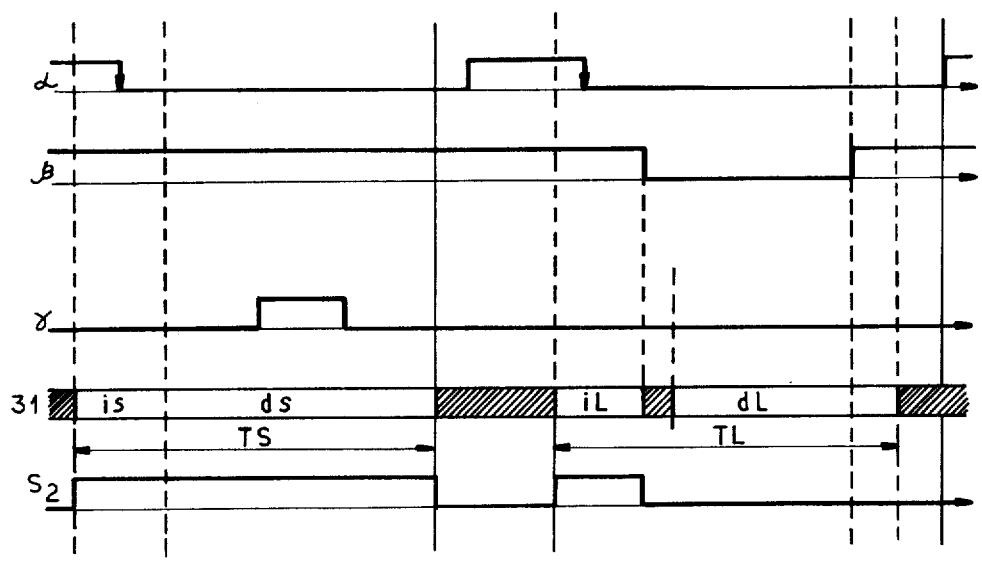
FIG. 2c is a graph similar to FIG. 2b, representing other control signals.

We shall now refer to FIG. 2c in describing the command signals emitted by each logic network LCB. A first signal α delivered by network LCB of component CPU over lead 212, transmitter $BD_2$ and multiple 32 to interface I, memory M and port MEI of unit $UP_n$ is a sequence of pulses whose trailing edges induce the storage of addresses generated on multiple 31 by transmitter $BD_4$ of that component. A second signal β emitted onto multiple 32 enables the reading from components I, M, MEI (FIG. 1) onto multiple 31 of data to be loaded into internal registers of calculators ULAR by way of receivers $BR_3$ and leads 217. Another signal γ produced by network LCB identifies the times during which devices addressed by transmitter $BD_4$ of microprocessor CPU may read data generated on multiple 31 by the associated calculator ULAR via its respective register RU and transmitter $BD_3$. Writing operations by the "hot" microprocessor CPU, confined to a time interval TS, include the emission of addresses onto lead 31 during a subinterval iS and the emission of data during a subinterval dS. Reading operations by the microprocessor pair take place during an interval TL which comprises a subinterval iL for the emission of addresses onto multiple 31 by the active transmitter $BD_4$ and a subinterval dL for the emission of data onto multiple 31 by components I, M, MEI. FIG. 2c also shows a sample of signal $S_2$ coinciding with intervals TS and iL.

Preprocessing of telephone signals by microprocessors CPU, CPU' is initated periodically through conventional interrupt procedures effectuated by interface I (FIG. 1) or upon the energization of leads 279 by counters CTR at the end of N microcycles of period T. Preprocessing results are stored in internal memory M (FIG. 1) for utilization by microprocessors CPU, CPU' in subsequent processing operations, normal processing being resumed upon completion of outstanding preprocessing steps. It is to be noted that use of the same memory M for both preprocessing and final processing greatly facilitates information flow and increases the diagnosability of memory areas accessed predominantly during telephone-signal preprocessing.

In a processing system according to our present invention, using a σ-bit code words, σ signals are preprocessed simultaneously; a sample of a signal and parameters concerning the preprocessing of this signal are carried in corresponding bit positions of a plurality of such words. Upon the completion of a sequence of Boolean operations on the several words containing the preprocessing information of the σ signals, microprocessors CPU, CPU' store resulting data in one or more locations in memory M.

In the processing of telephone signals, actual signal-level transitions must be differentiated from spurious transitions due to the interference of overlapping signals and to random spike generation. Actual transitions are generally determined by "up-down" counters which measure the permanence of logic levels of respective telephone signals. Let us assume that σ=16, i.e. that 16 signals are preprocessed simultaneously, and that each calculator ULAR contains 16 two-bit counters each decremented if the associated signal has a logic level "0" and incremented if that signal has a logic level "1". Let us further assume that any counter in a 0—0 status will remain unchanged if the respective signal has a "0" level and that any counter in a 1—1 status will retain such status if the respective signal has a "1" level. A processor operating according to conventional procedures would divide the 16 counters into two groups, horizontally distributing their 32 read-out bits to form four 8-bit words. Multiple shifts (by two positions) would be required of the memory locations occupied by these four words; moreover, at every vertical step the counters would be incremented or decremented according to the conditions heretofore assumed. Such conventional procedures could necessitate 90 elementary logic operations, whereas a microprocessor utilizing an algorithm according to our present invention will execute only 10 elementary logic operations for each signal level being preprocessed. This algorithm is defined by the following pair of Boolean equations wherein $F_x$ is the sampled logic level of a generic lead x (x=0, 1–15), $A_x$ is a bit less significant than the reading of the $x^{th}$ counter before sampling, $B_x$ is a bit more significant than the reading of the $x^{th}$ counter before sampling, $A_x'$ is a bit less significant than the reading of the $x^{th}$ counter after sampling, and $B_x'$ is a bit more significant than the reading of the $x^{th}$ counter after sampling:

$$A_x' = B_x(A_x + F_x) + A_x F_x$$

$$B_x' = A_x B_x + F_x(A_x + B_x).$$

Each logic operation is executed by a calculator ULAR simultaneously on 16 sets of data, according to microinstructions stored in memory MMP. After 10 microcycles each having a period T, 16 sampled signal levels have been integrated into previously preprocessed data stored in memory M (FIG. 1). Because the preprocessing operations are carried out at a microinstructional level rather than at the instructional level typical of conventional processors, components CPU, CPU' can effect in real time both normal processing and preprocessing of signals necessary in the field of telecommunications.

Figure 3:
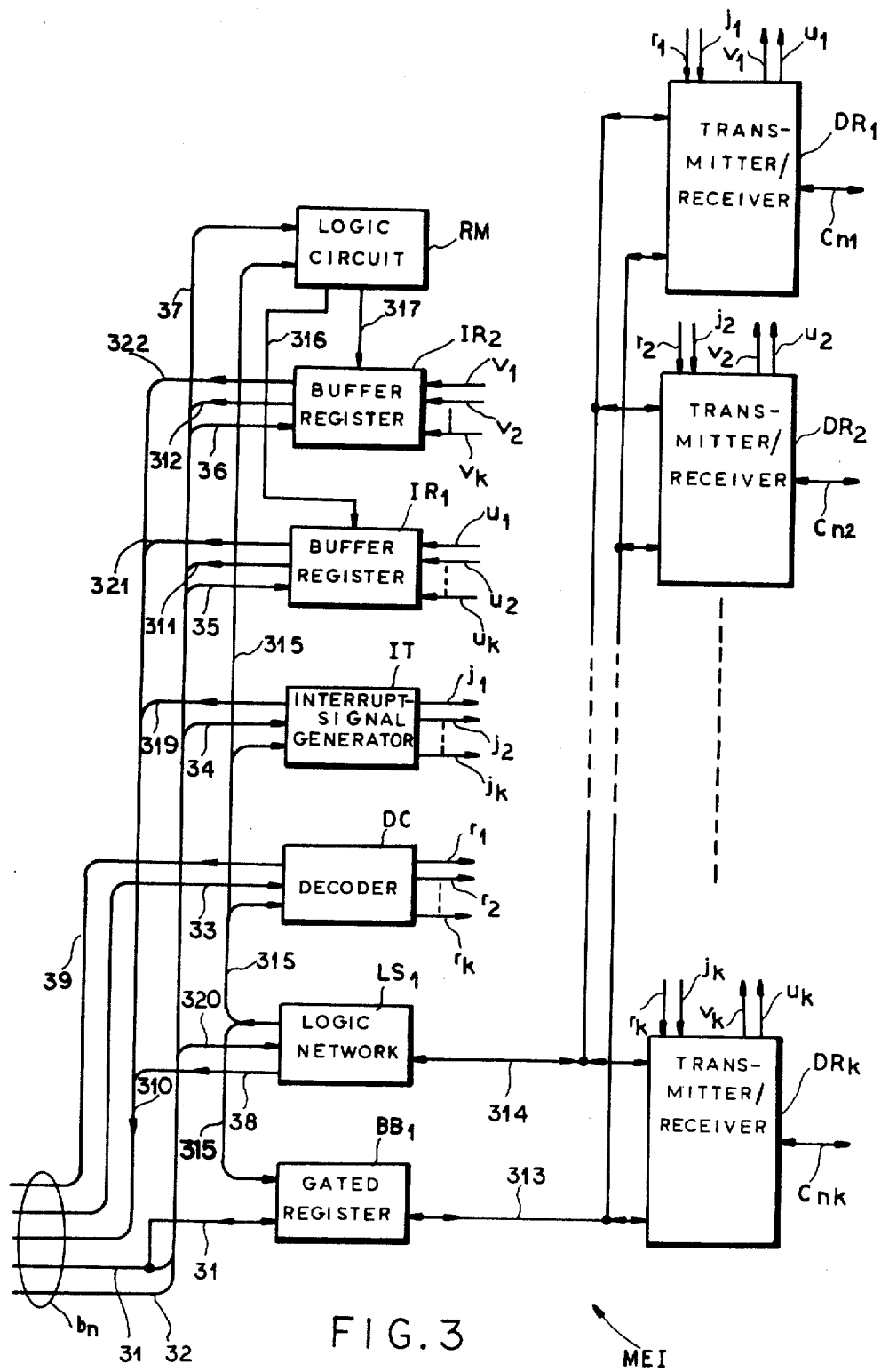
FIG. 3 is a block diagram of an input/output port included in a processing unit shown in FIG. 1.

We shall now describe the structure of input/output port MEI with respect to generic processing unit $UP_n$. As illustrated in FIG. 3, port MEI comprises k transmitter/receiver circuits $DR_1$, $DR_2$–$DR_k$ connected to respective memory banks $BM_1$, $BM_2$–$BM_k$ (FIG. 1) via respective buses $C_{n1}$, $C_{n2}$–$C_{nk}$. Circuits $DR_1$–$DR_k$ work into a logic network $LS_1$ through a bidirectional multiple 314 and into a buffer register $BB_1$ through another bidirectional multiple 313, this register being linked to microprocessors CPU, CPU' by means of multiple 31 of bus $b_n$. Register $BB_1$ includes bidirectional gates for the two-way transfer of data and addresses via multiple 31 between transmitter/receivers $DR_1$–$DR_k$ and microprocessors CPU, CPU'. In response to commands arriving over lead 32 from logic network LCB (FIG. 2), network $LS_1$ emits instructions to circuits $DR_1$–$DR_k$ over multiple 314 and a clock signal to register $BB_1$ over a lead 315'. Control signals are generated by network $LS_1$ on a lead 38 tied to lead 310.

As illustrated in FIG. 3, port MEI further comprises a decoder DC, an interrupt-signal generator IT, two additional buffer registers $IR_1$, $IR_2$ and a logic circuit RM. Decoder DC has input leads 315 and 33 extending from logic network $LS_1$ and from memory RIC, respectively, and output leads $r_1$, $r_2-r_k$ working into transmitter/receivers $DR_1$, $DR_2-DR_k$; circuits $DR_1-DR_k$ are selectively activated by decoder DC in accordance with addresses arriving from memory RIC over lead 33 and commands generated by logic network $LS_1$ on a line 315, comparator $CF_5$ (FIG. 2a) receiving a signal from decoder DC over lead 39 for checking the selective activation of these circuits. In response to commands arriving from active microprocessor CPU over a lead 34 (included in multiple 31) and from logic network $LS_1$ over line 315, generator IT supplies circuits $DR_1-DR_k$ via leads $j_1$, $j_2-j_k$ with interrupt signals requesting information transfer to or from other processors $UP_1-UP_{n-1}$ (FIG. 1). Buffer register $IR_1$ receives on leads $u_1$, $u_2-u_k$, extending from transmitter/receivers $DR_1-DR_k$, requests for inter-processor information transfer, the reception of interrupt signals on leads $u_1-u_k$ being communicated to components CPU, CPU' via leads 321, 310; upon receiving a command from logic network LCB (FIG. 2a) over multiple 32 and a lead 35, register $IR_1$ transmits its stored interrupt requests to the microprocessors CPU, CPU' over a lead 311 and multiple 31. Register $IR_2$, connected to circuits $DR_1-DR_k$ by respective leads $v_1$, $v_2-v_k$, receives and temporarily stores signals alerting processing unit $UP_n$ to any memory-bank malfunction and informs microprocessors CPU, CPU' via leads 322, 310 of the reception of such alert signals; upon receiving a command on a lead 36 tied to multiple 32, register $IR_2$ transfers its stored alert signals to components CPU, CPU' via a lead 312 and multiple 31. Logic circuit RM, having a pair of inputs connected to network LCB (FIG. 2a) via multiple 32 and a lead 37 and to network $LS_1$ via line 315, temporarily stores masking commands transmitted from component CPU and arriving on lead 37, and emits disabling signals to registers $IR_1$, $IR_2$ via leads 316, 317, upon receiving an enabling signal from network $LS_1$.

Figure 4:
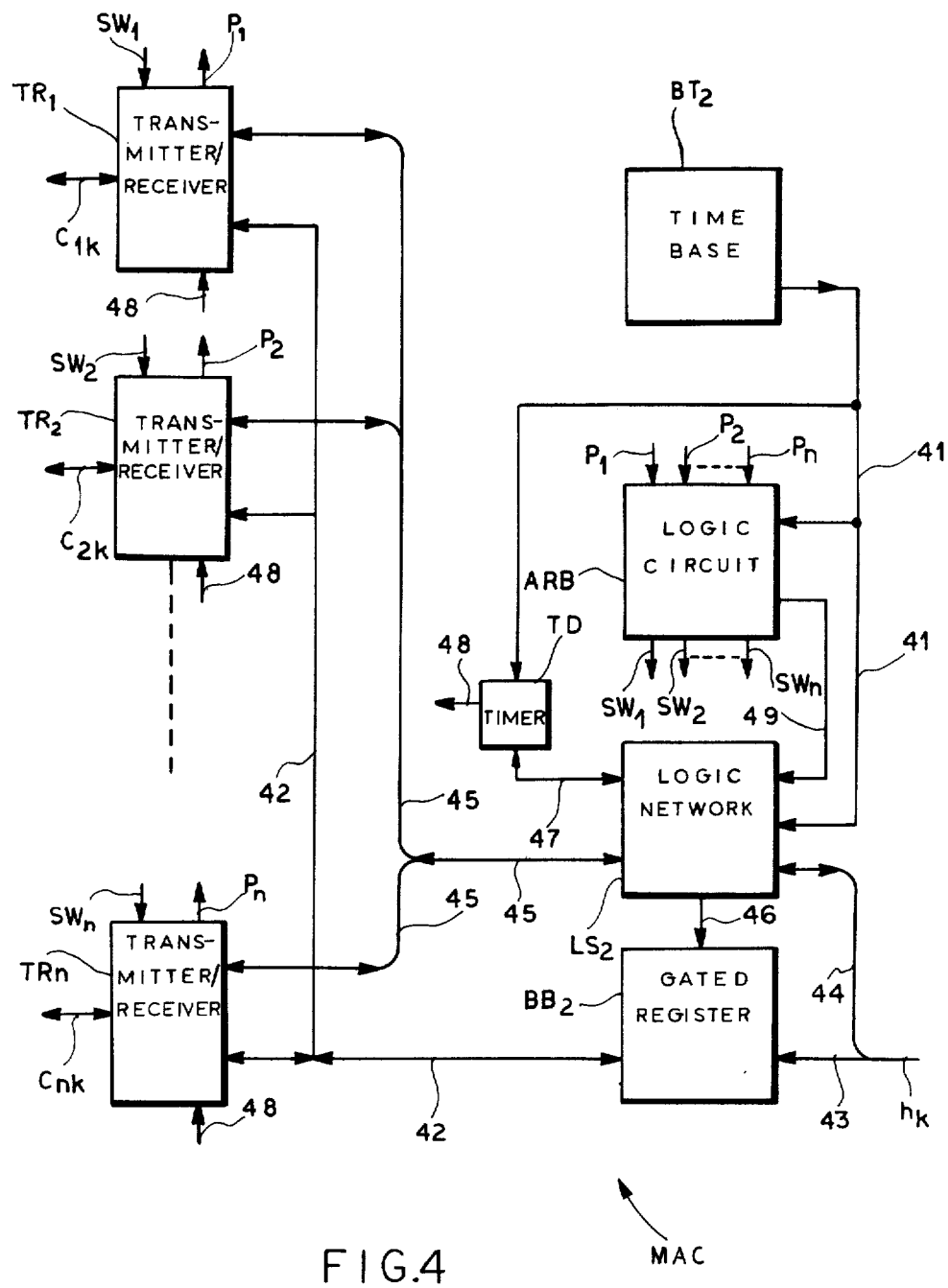
FIG. 4 is a block diagram of an input/output port associated with a memory bank shown in FIG. 1.

Input/output ports MEI function as bus expanders, while ports MAC function as input and arbitrating circuits. We shall now describe the structure of ports MAC with respect to generic memory bank $BM_k$. As illustrated in FIG. 4, port MAC includes a gated register $BB_2$ and a logic network $LS_2$ having the same internal structures as register $BB_1$ and network $LS_1$ (FIG. 3), respectively. Register $BB_2$ and logic network $LS_2$ are linked via bidirectional multiples 42 and 45 to n transmitter/receiver circuits $TR_1$, $TR_2-TR_n$ which are analogous to blocks $DR_1-DR_k$ and work into processing units $UP_1-UP_n$ by way of respective buses $C_{1k}$, $C_{2k}-C_{nk}$. Upon receiving information on these buses, circuits $TR_1-TR_n$ emit access-request signals on leads $p_1$, $p_2-p_n$ extending to the logic circuit ARB already referred to. This circuit recurrently scans leads $p_1-p_n$ and generates on leads $SW_1$, $SW_2-SW_n$, extending to transmitter/receivers $TR_1-TR_n$, signals enabling the readout of stored information to register $BB_2$ over multiple 42, the order in which enabling signals are generated on leads $SW_1-SW_n$ during any scanning or sampling cycle being determined by pre-established priorities with respect to energized leads $p_1-p_n$. Arbitrating circuit ARB has an output lead 49 joined to network $LS_2$ for informing same of the initiation and termination of transmission from an enabled transmitter/receiver $TR_1-TR_n$, device $LS_2$ in turn sending to register $BB_2$ via a lead 46 an activation signal indicating the direction of transmission. Logic network $LS_2$ is tied by a bidirectional multiple 47 to a timer TD which is linked by an output lead 48 to transmitter/receivers $TR_1-TR_n$. Timer TD is activated by logic network $LD_2$ and may temporarily inhibit the functioning of transmitter/receivers $TR_1-TR_n$ by emitting an interrupt signal on lead 48; network $LS_2$ is informed by a signal on multiple 47 of any interruption by this timer. Logic circuits $LS_2$, ARB and timer TD are fed a clock signal on a lead 41 extending from a time base $BT_2$. Network $LS_2$ and register $BB_2$ are tied to memory-bank bus $h_k$ via respective leads 44 and 43.

The multiprocessor illustrated in FIG. 1 has a range of processing speeds, storage capacities and reliabilities at least partially determined by the number of processing units $UP_1-UP_n$ and memory banks $BM_1-BM_k$. The microprocessors CPU, CPU' in each processing unit $UP_1-UP_n$ have direct access to their associated internal memories M and indirect access, via ports MEI and MAC, to bank memories MM. Because access to the internal memories M will generally be more rapid than access to the external memories MM, the former will store program instructions which are utilized most frequently, in addition to data being handled by the respective microprocessor pairs. Whether a signal emitted by expander UEA on lead 221 (FIG. 2a) specifies an internal or an external memory address is determined by decoder D: if the address $\tau_2$ on lead 221 is less than a predetermined threshold, it will be transmitted over multiple 31 only to memory M, whereas if $\tau_2$ has a numerical value surpassing the decoder threshold, code converter RIC will be enabled by a signal on lead 280 to emit a memory-bank address on lead 223, this address being transmitted to decoder DC (FIG. 3) for activating a transmitter/receiver $DR_1-DR_k$ corresponding to the memory bank $BM_1-BM_k$ being addressed. The address generated on lead 221 by expander UEA is then conducted, under the control of logic network $LS_1$, from register $BB_1$ through the activated transmitter/receiver to the addressed memory bank.

Data and instruction words are stored in memory banks $BM_1-BM_k$ according to an interleaving technique whereby, in every group of $k_p$ words having consecutive addresses, successive words are stored in consecutively addressed memory banks. Thus, if $k_p$ words have addresses $z+1$, $z+2-z+k_p$, the first word is stored in memory bank $BM_1$, the second word in bank $BM_2$ and the $k_p{}^{th}$ word in bank $BM_{kp}$. For example, let us assume that $k_p=4$, i.e. that there are four primary memory banks $BM_1-BM_4$; then addresses 0, 4, 8-are located in bank $BM_k$, addresses 1, 5, 9-in bank $BM_2$, addresses 2, 6, 10-in bank $BM_3$ and addresses 3, 7, 11-in bank $BM_4$. Interleaving data and instructions in memory banks $BM_1-BM_k$ inhibit any loss of global processing capacity due to the queuing up of processing units $UP_1-UP_n$ in requesting access to the memory banks. It is to be noted that the connection of units $UP_1-UP_n$ to banks $BM_1-BM_k$ via bidirectional buses $C_{11}-C_{nk}$ greatly facilitates information flow, owing to this reduction of congestion in memory-bank accessing, and increases system reliability, owing to speedy and efficient isolation of faulty or malfunctioning units.

If memory banks $BM_1-BM_k$ are grouped into $k_p$ primary banks, $k_s$ secondary banks and $k_r$ standby banks, each data or instruction word is stored in a primary-memory location and in a parallel location in a corresponding secondary memory bank. The standby banks are called into operation only upon failure of a primary or a secondary bank. Duplication of memory stores allows continued functioning of the processing system shown in FIG. 1, even upon failure of up to $k_p+k_r$ memory banks, as described more fully hereinafter. Duplication also increases processing speed, because the units $UP_1-UP_n$ may be divided into a first group reading information only from the primary banks and a second group reading only from the secondary banks. The parallel memory configuration of primary and secondary banks is especially advantageous in the field of telecommunications, owing to the possibility of continued operation in the presence of failed or malfunctioning units.

Alternatively, storage facilities $BM_1-BM_k$ may be divided only into $k_p$ operating banks and $K_r=k_p$ standby banks, with $k_s=0$. Whether facilities $BM_1-BM_k$ are arranged in singular or in duplicate configuration, i.e. whether there are any secondary banks, is determined by the logic level of bit sd stored in register RS (FIG. 2a): if bit sd has logical value "s", the active microprocessor CPU will write a word only in a single location in memory banks $BM_1-BM_k$, whereas if bit sd has logical value "d", microprogram memory MMP will let multiplexer MXC successively feed to code converter RIC a pair of bits having different logic levels whereby converter RIC reads out the addresses of both a primary memory bank and a parallel secondary memory bank in which data generated on multiple 31 are to be written. Thus, in the case of duplicate memory-bank configuration, primary and secondary processing units read data and instructions only from primary or secondary banks, respectively, while each unit $UP_1-UP_n$ writes information in both primary and corresponding secondary banks. Upon writing information according to "test and set" instructions, however, a unit $UP_1-UP_n$ will check such writing operation by reading the newly written information only from the primary bank of the involved pair, in accordance with a "test and set" reading bit carried by lead 225 (FIG. 2a).

Upon the failure of one of the $k_p$ primary memory banks or one of the $k_s$ secondary banks, one of the $k_r$ standby banks is loaded with the contents of the faulty memory bank and has its address written in corresponding locations of memories RIC (FIG. 2a) which had held the address of the faulty bank. If all $k_r$ standby banks are being utilized as replacements and a malfunction arises in one of the members of a memory-bank pair, the address of the normally functioning member is substituted for the address of the malfunctioning member in each memory RIC, according to microinstructions stored in memory MMP. If a failure occurs in a memory bank without an operating mate, a secondary member of a normally functioning pair is appropriated as a replacement, memory MMP (FIG. 2a) substituting in code converters RIC the address of the primary member of this pair for the address of the appropriated secondary member. The replacement bank then assumes the contents of the malfunctioning bank and has its address relocated in memory RIC, as heretofore described. Thus, a processing system according to our present invention is provided with modalities, including converters RIC, for effectuating a reconfiguration of remote memories $BM_1-BM_k$ upon failure of as many as $k_p+k_r$ banks; the system illustrated in FIG. 1 will continue processing operations until the failure of a $(k_p+k_r+1)^{th}$ bank. It is to be noted that, owing to the versatility of memory RIC, reconfiguration generally occurs rapidly, i.e. without any information loss due to exchanges between processing units $UP_1-UP_n$ and banks $BM_1-BM_k$. Such rapid and reliable performance is particularly advantageous in processing systems designed to control telephone operations.

New methods of handling telephone signals, i.e. new processing programs, may be instituted in a system according to our present invention without interrupting normal operations. For example, a new program may be loaded into the $k_s$ secondary memory banks and one of the processing units $UP_1-UP_n$ (FIG. 1) may be consigned to testing this program while the remaining units have access to the $k_p$ primary banks for executing normal processing operations according to the old program. Once the new program has been completely checked by the testing processing unit, the remaining units are progressively given total access to the $k_s$ secondary banks. Upon the switching of all units $UP_1-UP_n$ onto the new program, this program is then duplicated in the $k_p$ primary banks.

Information exchange among processing units $UP_1-UP_n$ (FIG. 1) occurs via common remote memories $BM_1-BM_k$. A unit $UP_1-UP_n$ storing, in its respective internal memory M, a message to be transmitted to other such units has an interrupt signal generated by block IT (FIG. 3) and emitted to one or more memory banks $BM_1-BM_k$, according to the microprogram stored in memory MMP (FIG. 2a). An interrupt signal generated by a block IT is received by an input/output port MAC which distributes the signal to various processing units $UP_1-UP_n$ via transmitter/receivers $TR_1-TR_n$ and bus network $C_{11}-C_{nk}$. Thus, communication among the processing units is effectuated by means of components MEI, MAC and $C_{11}-C_{nk}$ (FIG. 1) normally serving to connect microprocessors CPU, CPU' with memories MM; no additional inter-processor connections need be formed.

Alternatively, information exchange among units $UP_1-UP_n$ may take place according to a "mailbox" technique whereby data to be transferred are stored in special locations in common memories $BM_1-BM_k$ which are periodically sampled by these units.

Figure 5:
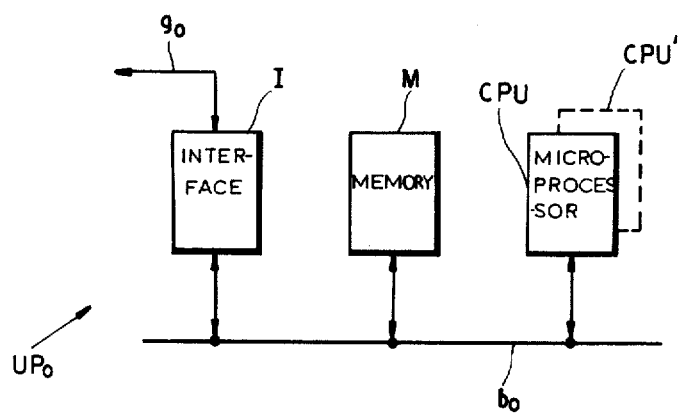
FIG. 5 is a block diagram of a processing unit generally as shown in FIG. 1.

FIG. 5 shows a monoprocessor unit $UP_o$, generally similar to units $UP_1-UP_n$ of FIG. 1, with a microprocessor pair CPU, CPU' according to our present invention. Interface module I, memory module M and microprocessors CPU, CPU' are all connected to a bidirectional bus $b_o$, interface I communicating with peripheral units (not shown) via a lead $g_o$.

Figure 6:
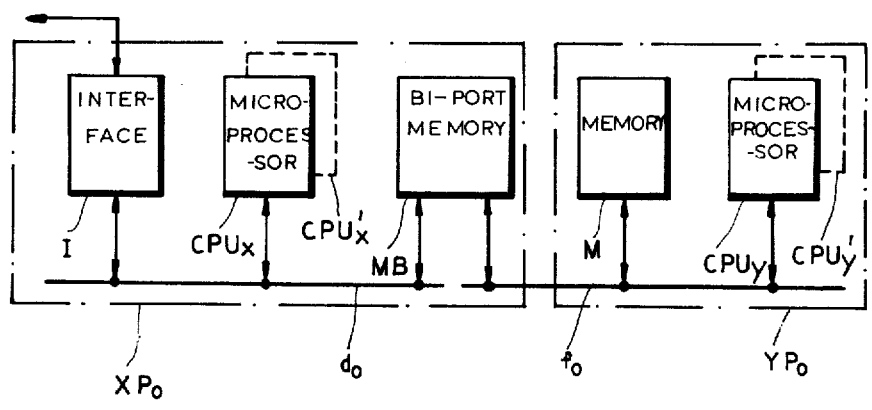
FIG. 6 is a block diagram similar to FIG. 5, illustrating a modification.

As illustrated in FIG. 6, another modular processing unit $UPA_o$ according to our present invention comprises a preprocessing assembly $XP_o$ and a main processing assembly $YP_o$, the former including an interface I, twin microprocessors $CPU_x$, $CPU_x'$ and a bi-port memory MB all connected to an asynchronous bidirectional bus $d_o$ similar to bus $b_n$ (FIGS. 1 and 2a). Assembly $YP_o$ has a pair of microprocessors $CPU_y$, $CPU_y'$ tied to a memory module M and to bi-port memory MB via an asynchronous bidirectional bus $f_o$ similar to bus $d_o$. Memory MB includes a conventional data store and a logic network (not shown) arbitrating access requests from microprocessors $CPU_x$, $CPU_x'$ and $CPU_y$, $CPU_y'$ primarily according to priority of arrival and secondarily with alternation of precedence in the case of simultaneous access requests. Microprocessors $CPU_x$, CPU$_x'$, CPU$_y$, CPU$_y'$ serve as self-checking preprocessing and main processing components, respectively.

Figure 10:
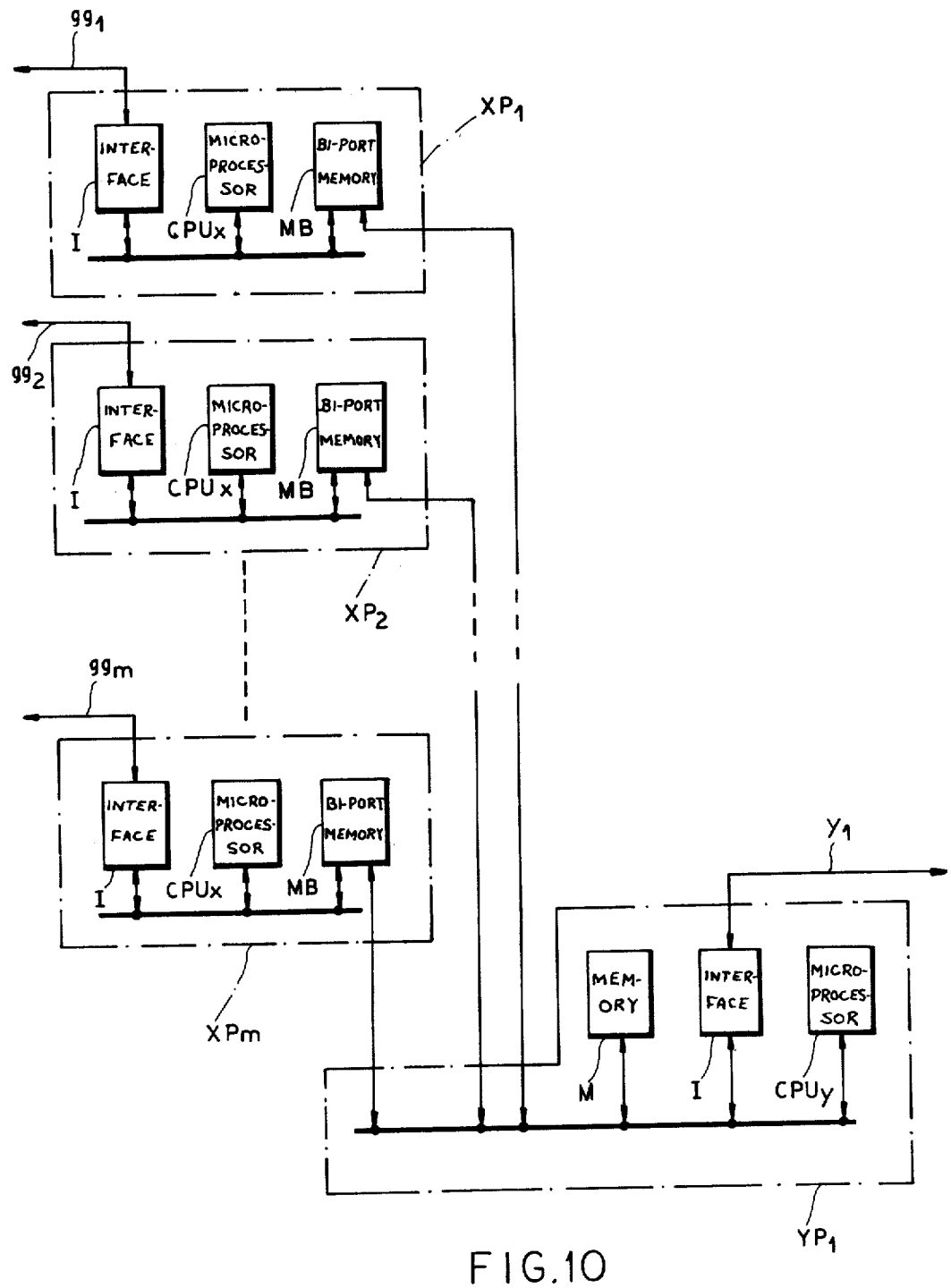
FIG. 10 is a block diagram of a system having a plurality of preprocessing units working into a single main processing unit.

The processing capacity and reliability of unit UPA$_o$ (FIG. 6), already exceeding that of monoprocessor unit UP$_o$ (FIG. 5), may be further increased by the addition of other assemblies. In FIG. 10 we have illustrated a plurality of such assemblies XP$_1$, XP$_2$-XP$_m$ each having modular components including an interface I, a microprocessor CPU$_x$ and a bi-port memory MB; memories MB are all connected to a single processing assembly YP$_1$ which includes an interface module I in addition to a modular memory M and a microprocessor CPU$_y$. Telephone signals arriving via leads gg$_1$, gg$_2$-gg$_m$ at assemblies XP$_1$-XP$_m$ are preprocessed thereby and transferred to assembly YP$_1$ via their respective bi-port memories MB, the results of the processing operations being passed on by an output lead y$_1$. The system shown in FIG. 10 may represent a two-stage module in a multistage hierarchical processing system in which assembly YP$_1$ is linked in parallel with a plurality of identical assemblies to a higher-level unit. Assembly YP$_1$ may work via lead y$_1$ into an identical assembly for performing self-diagnostic operations, as described more fully hereinafter with reference to FIGS. 7 and 8.

Figure 7:
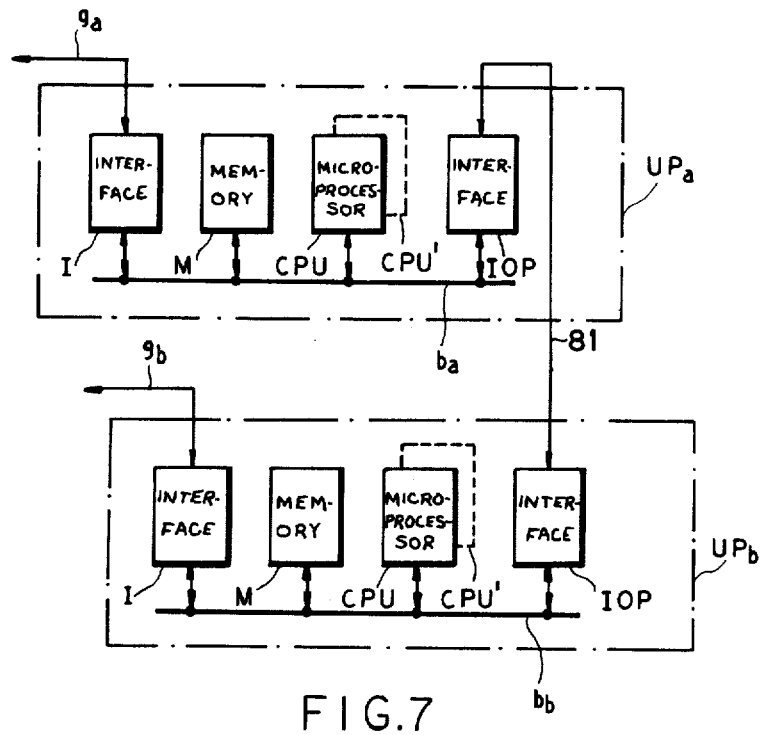
FIG. 7 is a block diagram of a pair of parallel processing units.

In FIG. 7 we have shown two identical processing units UP$_a$, UP$_b$ interconnected by respective input/output interfaces IOP and a bidirectional multiple 81. Each unit UP$_a$, UP$_b$ includes an interface module I, a memory M, twin microprocessors CPU and CPU' and the respective interface module IOP tied together via respective internal buses b$_a$, b$_b$ which are identical in structure with bus b$_n$ (FIGS. 1 and 2a). One of the two processing units UP$_a$, UP$_b$ is generally disabled by the program from emitting data resulting from processing operations and serves only to check the results of the other unit.

Telephone signals received simultaneously by units UP$_a$, UP$_b$ via parallel multiples g$_a$, g$_b$ are checked by interfaces IOP prior to processing (and preprocessing) by components CPU, CPU'. Any error detected by the twin microprocessors CPU, CPU' in either unit UP$_a$, UP$_b$, including the failure or malfunction of the respective microprocessor pair CPU, CPU', is communicated to the interface IOP of the other processing unit whereupon this interface generates an interrupt signal toward its associated microprocessor pair, inducing same to sample a register in the interface which has been loaded with a code indicating failure. Let us assume that unit UP$_a$ is the transmitting member of pair UP$_a$, UP$_b$ and that unit UP$_b$ is blocked. Prior to emission on an output lead of multiple g$_a$, results produced by unit UP$_a$ are compared via interfaces IOP with those of unit UP$_b$ so that any error undetected by microprocessors CPU, CPU' will be recognized by these interfaces. Upon divergence of the results of the two processing units UP$_a$, UP$_b$, transmission onto multiple g$_a$ is blocked and a subprogram is initiated by microprocessors CPU, CPU' for localizing the source of error. Because microprocessors CPU, CPU' are self-checking structures, as heretofore described with reference to FIG. 2a, any error detected by interfaces IOP will generally be unattributable to the microprocessors. If one or both components CPU, CPU' of unit UP$_a$ fails, however, a signal generated on lead 282 (see FIG. 2a) of bus b$_a$ will be transmitted to unit UP$_b$, enabling same to commence data emission on an output lead of multiple g$_b$ while unit UP$_a$ is disabled.

In order to facilitate the exchange of signals between processing units UP$_a$, UP$_b$, interfaces IOP include logical circuitry relating to the generation of signal rpl on lead 310, heretofore described with reference to FIG. 2a. Signal rpl is conventionally produced at the output of an OR gate receiving at its inputs two signals rpl$_t$ and rpl$_r$ in turn generated by the interface in response to signals $\beta$ and $\gamma$ (FIG. 2c), these latter signals enabling the transmission and reception of data from multiple 31 (FIG. 2a) by the interface. Before a microprocessor pair CPU, CPU' (FIGS. 2a and 7) can exchange data with a conventional interface, however, it must be determined whether "check and status" registers in the interface are storing signals dr$_t$ and dr$_r$ generated by a peripheral unit and fed to the interface upon the transmission or the reception of data by the peripheral unit; signals dr$_t$ and dr$_r$ cause the emission of an interrupt signal from the involved interface to its associated microprocessor pair. In an interface IOP according to our present invention, signal rpl is generated at the output of a nonillustrated logic circuit which includes an OR gate receiving signals from a pair of AND gates that in turn are fed signals rpl$_t$, dr$_t$ and rpl$_r$, dr$_r$, respectively. Thus, $$rpl = rpl_t \cdot dr_t + rpl_r \cdot dr_r.$$

Interface IOP, generating signal rpl according to this formula, facilitates data exchange between interfaces IOP of processing units UP$_a$ and UP$_b$ because microprocessors CPU, CPU' are no longer required to monitor "check and status" registers for the presence of signals dr$_t$, dr$_r$.

Figure 8:
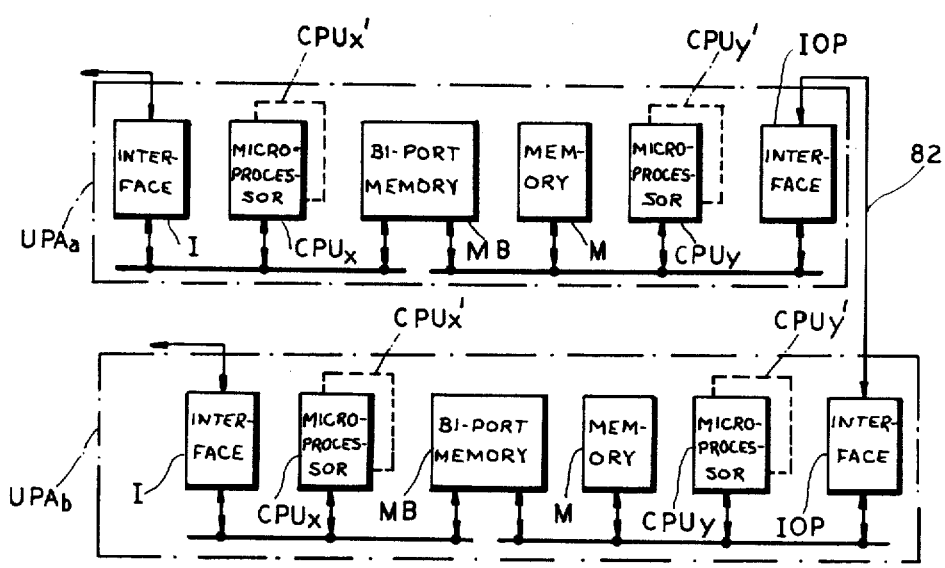
FIG. 8 is a block diagram similar to FIG. 7, showing a combination of processing units of the type illustrated in FIG. 6.

In FIG. 8 we have shown two identical processing units UPA$_a$ and UPA$_b$ connected by respective interface modules IOP and a bidirectional multiple 82 having the same structure as multiple 81 of FIG. 7. Each unit UPA$_a$, UPA$_b$ has an interface module I, twin microprocessors CPU$_x$, CPU$_x'$, a bi-port memory MB, a memory module M and another pair of microprocessors CPU$_y$, CPU$_y'$, in addition to interface module IOP. As heretofore described with reference to FIG. 6, the incoming data are preprocessed by components CPU$_x$, CPU$_x'$, temporarily stored in bi-port memories MB and processed by components CPU$_y$, CPU$_y'$. Prior to the emission of results by the energized interface I of the active processing unit, for example unit UPA$_a$, these results are checked via interfaces IOP and multiple 82 with the results of parallel processing operations in the dummy unit UPA$_b$. Upon divergence of the results produced by the two units UPA$_a$ and UPA$_b$, the actively transmitting interface I (of unit UPA$_a$) is disabled and a subprogram is initiated by the microprocessors CPU$_y$, CPU$_y'$ of each unit UPA$_a$, UPA$_b$ to locate any source of error. Owing to the intrinsic self-diagnostic procedures of microprocessor pairs CPU$_x$, CPU$_x'$ and CPU$_y$, CPU$_y'$, these components need not be examined by the error-localizing subprogram.

Figure 9:
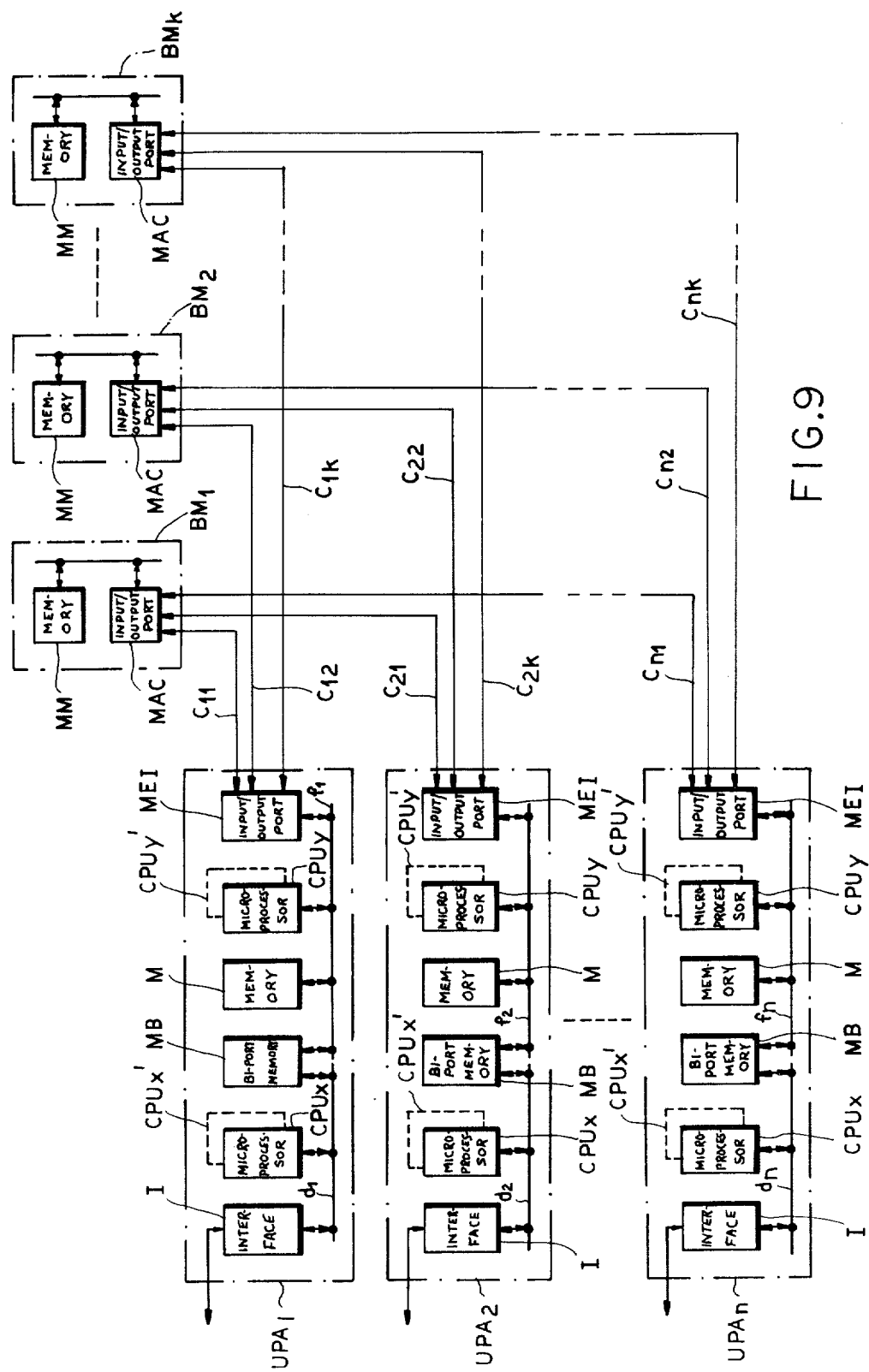
FIG. 9 is a block diagram similar to FIG. 1, showing a modified system.

As illustrated in FIG. 9, units UP$_1$-UP$_n$ of the multiprocessor shown in FIG. 1 may be replaced by processing units UPA$_1$, UPA$_2$-UPA$_n$ similar to unit UPA$_o$ shown in FIG. 6. In addition to an interface module I, preprocessing microprocessors CPU$_x$ and CPU$_x'$, a bi-port memory MB, a memory module M and microprocessors CPU$_y$ and CPU$_y'$, each unit UPA$_1$-UPA$_n$ includes an input/output port MEI as heretofore described with reference to FIGS. 1 and 3. Ports MEI serve to connect processing units UPA$_1$-UPA$_n$ via bidirectional buses C$_{11}$-C$_{1k}$, C$_{21}$-C$_{2k}$-C$_{n1}$-C$_{nk}$ to input/output ports MAC (see FIG. 4) of k memory banks BM$_1$-BM$_k$ which also include modular data stores MM.

The system shown in FIG. 9 operates as heretofore described with respect to FIG. 1, except for the separate performance of preprocessing operations by components $CPU_x$, $CPU_x'$ connected to bidirectional buses $d_1$, $d_2$-$d_n$ and of processing operations by components $CPU_y$, $CPU_y'$ tied to bidirectional buses $f_1$, $f_2$-$f_n$. Such separation of preprocessing and final processing operations increases the capacity of the system shown in FIG. 1 without overloading buses $C_{11}$-$C_{nk}$ and without requiring further buses linking units $UPA_1$-$UPA_n$ to memory banks $BM_1$-$BM_k$.

Figure 11:
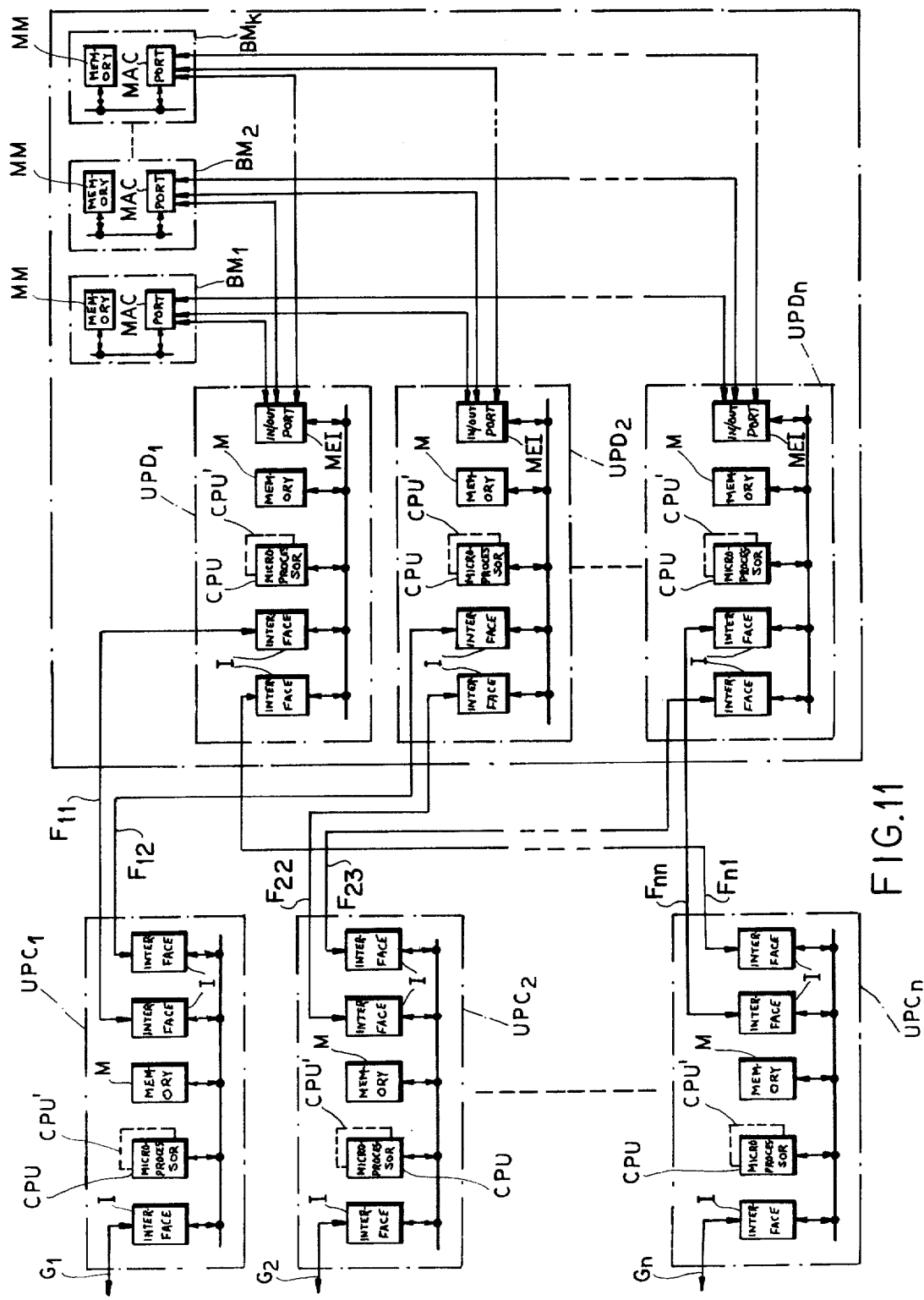
FIG. 11 is a block diagram similar to FIGS. 1 and 9, showing a modification of the system of FIG. 10.

As heretofore described with reference to FIG. 10, preprocessing components, $CPU_x$, $CPU_x'$ form a first level of a processing system and work via bi-port memories MB into components $CPU_y$, $CPU_y'$ forming a second or next-higher processing level. FIG. 11 shows a two-stage system whose first stage comprises n remote processing units $UPC_1$, $UPC_2$-$UPC_n$ tied by means of 2 n bidirectional buses $F_{11}$, $F_{12}$ and $F_{22}$, $F_{23}$-$F_{nn}$, $F_{n1}$ and respective pairs of interface modules I to n local processing units $UPD_1$, $UPD_2$-$UPD_n$ included, for instance, in an exchange. In addition to two interfaces I for communicating with two remote processing units, each local unit $UPD_1$-$UPD_n$ includes a memory module M, a pair of identical microprocessors CPU, CPU' and an input/output port MEI connected to k memory banks $BM_1$-$BM_k$, which in turn comprise arbitrating input/output modules MAC and data stores MM. Remote units $UPC_1$-$UPC_n$ include interface modules I tied via bidirectional multiples $G_1$, $G_2$-$G_n$ to peripheral units such as subscriber stations (not shown and further include twin microprocessors CPU, CPU', memories M and interfaces I linked to buses $F_{11}$, $F_{12}$, $F_{22}$, $F_{23}$-$F_{nn}$, $F_{n1}$. The processing system shown in FIG. 11 implements operations heretofore described with reference to FIG. 1.

It is to be noted that remote units $UPC_1$-$UPC_n$ continue normal preprocessing or processing operations even upon failure of a central processing unit $UPD_1$-$UPD_n$, owing to the fact that each lower-level unit $UPC_1$-$UPC_n$ is coupled to two higher-level units $UPD_1$-$UPD_n$.

We claim:

1. An electronic signal-processing system dialoguing with associated peripheral units, comprising:
    a plurality of modular processing units each including a pair of substantially identical microprocessors interlinked by a correlating connection, each microprocessor being provided with parallel input connections for receiving incoming messages from an internal signal path, only one of said microprocessors having an active output connection for transmitting outgoing messages to said signal path, the other of said microprocessors being available as a standby, each processing unit further including interface means inserted between said signal path and an associated one of said peripheral units, an internal memory connected to said signal path for storing processing information individual to the associated peripheral unit, and coupling means for selectively connecting said signal path to any one of a plurality of external two-way buses forming extensions of said signal path;
    a plurality of external memory banks storing general processing information utilizable by any of said processing units; and
    access means individual to each of said memory banks for facilitating communication thereof with any of said processing units, in response to a request therefrom, via a corresponding one of said external two-way buses;
    each microprocessor of said pair including logical circuitry for performing processing operations, a microprogram memory connected to said logical circuitry for controlling said processing operations, a sequencer linked to said microprogram memory for advancing the microprogram thereof by the emission of addresses of microinstructions to be successively read out therefrom, a time base connected to said logical circuitry and said sequencer for generating a control pulse to establish an operating cycle therefor, and monitoring means in each microprocessor operatively connected to the sequencers of both microprocessors of said pair via said correlating connection and being further connected to said time base for causing same to lengthen the control pulse thereof to double the normal duration of said operating cycle upon detecting an out-of-step condition of said sequencers, thereby enabling resynchronization of said microprocessors upon termination of said out-of-step condition after not more than one normal operating cycle, said one of said microprocessors having said logical circuitry linked with said signal path via said active output connection for sending out the results of said processing operations.

2. A system as defined in claim 1 wherein each of said microprocessors includes comparison means connected between said logical circuitry and said signal path for signaling, in the standby mode of the respective microprocessor, an alarm condition upon detecting a divergence of the results of said processing operations performed by the two paired microprocessors.

3. A system as defined in claim 1 or 2 wherein said correlating connection includes two conductors each connected to a stepping input of the sequencer of a respective microprocessor of said pair, said monitoring means comprising a comparator connected across said conductors.

4. A system as defined in claim 1 wherein each microprocessor of said pair includes an address store connected to said coupling means for transmitting memory-bank addresses thereto, logic means connected to said microprogram memory for identifying addresses of data-storage locations in said external banks and said internal memory, and a decoder connected to said logic means and to said address store for enabling the emission of memory-bank addresses therefrom to said coupling means upon detecting the identification of an external-memory address by said logic means.

5. A system as defined in claim 4 wherein said external memory banks are subdivided into at least a first group and a second group, the latter being available for standby purposes, each memory bank in said first group containing information identical with information stored in a corresponding memory bank in said second group, the microprogram memory of each microprocessor being connected to said address store for controlling, upon the identification by said logic means of data-storage locations in an external memory bank of said first group, the readout of the addresses of such memory bank and a corresponding external memory bank in said second group to be loaded with the same data.

6. A system as defined in claim 4 or 5 wherein said decoder is a comparator delivering emission-enabling signal to said address store upon detecting an address code generated by said logic means whose numerical value exceeds a predetermined threshold.

7. A system as defined in claim 4 or 5, wherein said coupling means includes a plurality of transmitter/receivers for selectively connecting said signal path to respective external two-way buses thereof, said coupling means further including decoding means connected to said address store and to said transmitter/receivers for controlling same to connect said signal path to an extension selected in accordance with an address emitted by said store.

* * * * *